US009925964B2

(12) United States Patent
Claussen et al.

(10) Patent No.: US 9,925,964 B2
(45) Date of Patent: Mar. 27, 2018

(54) VEHICLE BRAKING UNIT AND METHOD

(75) Inventors: Heiko Claussen, Hannover (DE);
Jurgen Eickhoff, Walsrode (DE);
Volker Heinrich, Nordstemmen (DE);
Ralph-Carsten Lulfing, Garbsen (DE);
Wolfgang Strache, Hemmingen (DE)

(73) Assignee: WABCO GMBH, Hannover (DE)

( * ) Notice: Subject to any disclaimer, the term of this patent is extended or adjusted under 35 U.S.C. 154(b) by 57 days.

(21) Appl. No.: 14/351,218

(22) PCT Filed: Aug. 10, 2012

(86) PCT No.: PCT/EP2012/003440
§ 371 (c)(1),
(2), (4) Date: Apr. 11, 2014

(87) PCT Pub. No.: WO2013/060398
PCT Pub. Date: May 2, 2013

(65) Prior Publication Data
US 2014/0306515 A1    Oct. 16, 2014

(30) Foreign Application Priority Data
Oct. 25, 2011   (DE) .................... 10 2011 116 906

(51) Int. Cl.
*B60T 8/176*    (2006.01)
*B60T 8/32*    (2006.01)
(Continued)

(52) U.S. Cl.
CPC ............ *B60T 8/176* (2013.01); *B60T 8/1708* (2013.01); *B60T 8/328* (2013.01); *B60T 8/4072* (2013.01);
(Continued)

(58) Field of Classification Search
CPC ........ B60T 8/176; B60T 8/885; B60T 8/1708; B60T 8/328; B60T 8/4072; B60T 8/4872; B60T 13/145; B60T 2270/402
See application file for complete search history.

(56) References Cited

U.S. PATENT DOCUMENTS 5,141,296 A * 8/1992 Arikawa ............... B60T 8/4013
303/113.2
5,169,215 A * 12/1992 Takata ..................... B60T 8/00
180/197
(Continued)

FOREIGN PATENT DOCUMENTS

DE    40 24 596 A1    2/1991
DE    41 02 496 A1    2/1992
(Continued)

*Primary Examiner* — Xuan Lan Nguyen
(74) *Attorney, Agent, or Firm* — Leydig, Voigt & Mayer, Ltd.

(57) ABSTRACT

A vehicle braking unit comprises an operating braking pressure inlet which receives an inlet braking pressure built up by a braking cylinder, and at least one operating brake pressure outlet at which an outlet braking pressure is provided for an operating brake modulator, which is upstream of the operating brake and provides anti-lock functionality. At least one connecting channel hydraulically connects the operating brake pressure inlet to the outlet. Brake fluid is supplied from a storage unit through the brake cylinder, the connecting channel and the operating brake modulator. The braking unit has a brake fluid inlet, through which the brake fluid is received from the storage unit, a brake fluid pump, by which the brake fluid is suctioned through the brake fluid inlet and a supply pressure is built up, and a valve unit that controls the outlet braking pressure and/or a parking brake release pressure by the supply pressure.

15 Claims, 3 Drawing Sheets

(51) Int. Cl.
  *B60T 8/40* (2006.01)
  *B60T 8/48* (2006.01)
  *B60T 8/17* (2006.01)
  *B60T 8/88* (2006.01)
  *B60T 13/14* (2006.01)

(52) U.S. Cl.
  CPC ............ *B60T 8/4872* (2013.01); *B60T 8/885* (2013.01); *B60T 13/145* (2013.01); *B60T 2270/402* (2013.01)

(56) References Cited

U.S. PATENT DOCUMENTS

| | | | |
|---|---|---|---|
| 6,179,389 B1 * | 1/2001 | Freitag | B60T 8/00 180/422 |
| 6,527,348 B2 * | 3/2003 | Jensen | B60T 17/18 303/113.1 |
| 7,341,319 B2 * | 3/2008 | Klusemann | B60T 7/085 303/20 |
| 2006/0284478 A1 * | 12/2006 | Binev | B60T 13/22 303/15 |
| 2009/0096281 A1 | 4/2009 | Rowan et al. | |
| 2011/0022283 A1 * | 1/2011 | Lovell | B60T 7/085 701/70 |
| 2011/0025119 A1 * | 2/2011 | Nishino | B60T 1/10 303/3 |

FOREIGN PATENT DOCUMENTS

| | | |
|---|---|---|
| DE | 40 29 793 A1 | 3/1992 |
| DE | 43 16 339 A1 | 11/1994 |
| DE | 195 16 639 A1 | 11/1996 |
| DE | 10 2009 000 781 A1 | 8/2010 |
| DE | 10 2010 038 328 A1 | 2/2011 |
| DE | 10 2010 012 886 A1 | 9/2011 |
| ID | 198 17 190 C1 | 7/1999 |
| WO | WO 97/43153 | 11/1997 |
| WO | WO 98/26967 | 6/1998 |
| WO | WO 2009/019022 A2 | 2/2009 |
| WO | WO 2012035652 A1 * | 3/2012 |

* cited by examiner

VEHICLE BRAKING UNIT AND METHOD

FIELD OF THE INVENTION

The invention generally relates to a braking method and brake device for the hydraulic brake system of a vehicle, in particular a utility vehicle.

BACKGROUND OF THE INVENTION

In hydraulic brake systems, in response to the operation of the vehicle brake pedal, pressure is generated in two service brake circuits that are filled with brake fluid, and, thus, the service brake is hydraulically operated. For this purpose, the service brake has multiple hydraulically actuable brake cylinders arranged at the axles or wheels of the vehicle. As a result of the operation of the brake pedal, the hydraulic pressure is built up in a master brake-cylinder, and is provided to the service brake circuits directly in the case of a first known brake system or via a relay valve in the case of a second known brake system. If too little brake fluid is available when the brake pedal is not actuated, brake fluid flows out of a storage tank into the master cylinder. By contrast, during an operation of the brake pedal, the connection to the storage tank is shut off such that a service brake pressure can build up and the brake fluid does not flow back into the storage tank.

It is also known, in the case of hydraulic brake systems, to provide a brake force booster that assists the operation of the master cylinder by means of the brake pedal such that the brake pressure in the brake circuits can be built up with a relatively low operational force on the brake pedal. The brake force booster is often realized by way of a hydraulic booster circuit, which uses a hydraulic fluid or a hydraulic oil, but not brake fluid, as the pressure medium. The hydraulic booster circuit generally supplies pressure to multiple devices on the vehicle, specifically to a hydraulic steering assistance device, the pressure being built up by means of a steering assistance pump in the hydraulic booster circuit.

In the case of the first known brake system noted above, a service brake modulator, which provides an anti-lock brake function, is connected upstream of the service brake or of the brake cylinders. The service brake modulator has multiple valves and a return pump for each brake circuit, such that, through corresponding actuation of the valves, the hydraulic pressure at the individual brake cylinders can be lowered in a targeted manner below the service brake pressure modulated by means of the master cylinder, and the brake on wheels at which locking or a locking tendency is detected can be released, or the brake pressure at the brake can be at least reduced.

The known first brake system provides an anti-lock function for a hydraulic brake system by means of the inexpensive service brake modulator. A disadvantage of this brake system is that an active brake pressure build-up, for example for traction control or for electronic stabilization of the vehicle, is not possible, or is at best possible to a restricted extent with additional valves in the service brake modulator.

The second known brake system noted above is the so-called "hydraulic power brake", which makes do without the brake force booster for the actuation of the master cylinder and without the service brake modulator with the return pumps, and permits brake force boosting, an anti-lock function and, additionally, an active brake pressure build-up in a different way. For this purpose, the service brake pressure is built up in the service brake circuits, in each case, by means of a brake fluid pump. The brake circuits are fed from a second storage tank, which is connected in unpressurized fashion to the storage tank for the supply to the master brake cylinder. By contrast, the service brake circuits are not fed with brake fluid by the master brake cylinder. A hydraulic pressure generated by means of the master brake cylinder serves merely for the actuation of relay valves in the service brake circuits, which relay valves control the pressure at the brake cylinders. For the anti-lock function, valves are connected upstream of the brake cylinders, by means of which brake fluid can be discharged to the second storage tank, and the brake can thus be released.

For an active brake pressure build-up, the relay valves are actuated not only by means of the master cylinder, but also hydraulically. Furthermore, the second known brake system also permits the actuation of a parking brake, wherein the parking brake is supplied with brake fluid, or with the necessary brake pressure for the release of the parking brake, from one of the brake circuits via a switchable valve.

The second known brake system has the disadvantage that a brake fluid pump is required for each brake circuit, and, in each case, one pressure vessel connected downstream of the brake fluid pump is required for each brake circuit. The brake fluid pumps and the pressure vessels have a disadvantageously large space requirement, and are expensive.

SUMMARY OF THE INVENTION

Generally speaking, it is an object of the present invention to provide for an active brake pressure build-up in an improved manner.

The invention enhances the first known brake system noted above by providing additional functions that permit, in particular, an active brake pressure build-up.

The brake device according to an embodiment of the present invention has at least one service brake pressure inlet for receiving, from a master brake cylinder, a hydraulic inlet brake pressure built up by means of the master cylinder. Furthermore, the brake device has at least one service brake pressure outlet for providing an outlet brake pressure for a service brake modulator, which is connected upstream of a service brake and which provides an anti-lock function. Furthermore, the brake device has at least one connecting duct for hydraulic connection of the service brake pressure inlet to the service brake pressure outlet and for supplying brake fluid to the service brake from a brake fluid accumulator device by the master brake cylinder, and, furthermore, through the connecting duct and through the service brake modulator. In the first known brake system, the brake device is realized by means of a pressure medium connection, for example a brake hose, which connects the master cylinder to the service brake modulator.

The brake device according to an embodiment of the invention also has a brake fluid inlet for withdrawing brake fluid from the brake fluid accumulator device through the brake fluid inlet. Furthermore, the brake device has a brake fluid pump for drawing-in the brake fluid through the brake fluid inlet and for building up a storage pressure. A valve device actively modulates the outlet brake pressure, and/or a parking brake release pressure for a parking brake, by means of the built-up storage pressure.

It is thus the case that only one brake fluid pump is required for the active brake pressure build-up. The brake fluid pump is, by contrast, not required for the normal brake pressure build-up in the service brake circuits by means of the master brake cylinder, such that the normal brake pressure build-up can be realized by means of the master brake cylinder even in the event of failure of the brake fluid pump.

It is preferable for the brake device to have, for each service brake circuit, a service brake pressure inlet, a service brake pressure outlet, and a connecting duct. In each case, two service brake pressure inlets, service brake pressure outlets and connecting ducts are provided.

The brake fluid pump delivers brake fluid out of the brake fluid accumulator device and stores a built-up storage pressure by means of a brake pressure vessel.

By means of the built-up storage pressure, the valve device actively modulates the outlet brake pressure when required. It is thus possible for a pressure higher than that at the service brake pressure inlet, or than a pressure predefined by means of the master brake cylinder, to be realized at the service brake pressure outlet.

Alternatively or in addition, by means of the built-up storage pressure, the valve device actively modulates the parking brake release pressure for the parking brake. In this way, the parking brake can be operated and released hydraulically. Here, the parking brake preferably comprises at least one spring brake cylinder, wherein the spring-type actuator engages the parking brake counter to the parking brake release pressure. A reduction of the parking brake release pressure thus leads to engagement of the parking brake, and an increase of the parking brake release pressure leads to release of the parking brake.

In one embodiment of the present invention, the brake device is a brake unit arranged in a common housing. In an alternative embodiment, multiple units each have parts of the brake device.

In other embodiments, the brake device additionally comprises the brake fluid accumulator device and/or the master brake cylinder and/or a brake force booster and/or the service brake modulator.

The service brake modulator is preferably a unit that is arranged in a dedicated housing. The service brake modulator provides an anti-lock function and, for this purpose, has multiple valves, in particular, electromagnetic valves, and, for each brake circuit, in each case, one return pump and one accumulator. The return pumps may be driven by a common pump motor.

In one embodiment of the braking method, at least one shut-off valve arranged in the connecting duct shuts off the service brake pressure inlet with respect to the service brake pressure outlet. Furthermore, at least one feed flow valve actively increases the outlet brake pressure by introducing brake fluid, which has been drawn in by means of the brake fluid pump, into the connecting duct between the shut-off valve and the service brake pressure outlet. The outlet brake pressure is actively modulated in this way. The outlet brake pressure can thus be set independently of the inlet brake pressure provided by means of the master brake cylinder. It is preferable for a shut-off valve to be arranged in each connecting duct and/or in each service brake circuit. In each service brake circuit, the brake pressure can be increased by means of, in each case, one feed flow valve.

The shut-off valve is preferably designed such that, in the unoperated or deenergized state, it assumes its pass-through position under the force of a spring and, when operated or electrically energized, provides a shut-off action. The feed flow valve is preferably designed such that, in the deenergized state, it assumes its locking position under the force of a spring and, in the energized state, increases the respective brake pressure by means of the built-up storage pressure. In this way, the service brake can continue to be operated by means of the master brake cylinder even in the event of a defect, for example a power failure, whereby the feed flow valve and the shut-off valve cannot be operated. The valve device can have both the shut-off valve and the feed flow valve.

In one embodiment of the braking method, a control device actuates the valve device designed for modulating the outlet brake pressure, whereby the outlet brake pressure is modulated. Here, the control device is designed such that the actuation of the valve device and the modulation of the outlet brake pressure are performed as a function of a determined driving state of the vehicle and/or, if a failure of a brake force boosting action is detected, as a function of a detected brake operation. In particular, the control device provides an active fast brake force build-up for traction control (ASR), for an electronic stability control (ESC) system, for a roll stability control (RSC) system for preventing lateral tilting or for emergency braking assistants.

Alternatively or in addition, a failure of the brake force boosting action may be detected by means of a sensor. A brake operation is detected by means of a further sensor. As a function of the detected brake operation, the outlet brake pressure for the operation of the service brake is thus actively modulated by means of the valve device, and the service brake is therefore operated as desired, or in accordance with the operation of the brake pedal, despite the lack of brake force assistance. The brake device accordingly has the control device and, in one embodiment, the sensor for detecting the failure of the brake force boosting action and/or the sensor for detecting the brake operation.

In another embodiment, the brake device has parking brake control electronics for control of the parking brake. The parking brake control electronics are preferably provided separately from service control electronics for control of the service brake. In this way, operation of the parking brake is possible entirely independently of the service brake. It is, however, preferable for the parking brake control electronics to be integrated into other control electronics or a control device other than, or not comprising, the service brake control electronics. Accordingly, in the braking method, the parking brake control electronics that are provided separately from the service brake control electronics control the parking brake.

In another embodiment, the brake device has a common storage tank for the supply of brake fluid to the service brake by the master brake cylinder and for the supply of brake fluid to the brake fluid pump through the brake fluid inlet. In particular, the brake fluid accumulator device has, or is formed as, the storage tank. The brake fluid pump can preferably modulate both the outlet brake pressure and also the parking brake release pressure, such that, in this case, the active brake pressure build-up for the service brake, the active brake pressure build-up for the parking brake and the supply to the service brake modulator by means of the master brake cylinder are realized from the same storage tank. Thus, only one housing need be provided for the storage tank, resulting in a small space requirement, little assembly outlay, and a reduction in the risk of possible brake fluid losses owing to leaks in connecting lines, thus reducing costs. The common storage tank is advantageously arranged in the region of the master brake cylinder, and can be mounted on the master brake cylinder. In one embodiment of the braking method, it is accordingly the case that brake fluid is supplied from the common storage tank to the service brake by means of the master brake cylinder and to the brake fluid pump through the brake fluid inlet.

In a further embodiment, the brake device has wake-up electronics that, in accordance with the corresponding braking method, switch the control device or parts of the control device and/or the service brake control electronics or parts of the service brake control electronics and/or the parking brake control electronics or parts of the parking brake control electronics from the rest state thereof into the operational state thereof in response to a brake operation being detected, in particular in the event of the control device or the respective control electronics being in the rest state. A steering assistance pump and/or some other pump for providing a supply to a hydraulic circuit used for the brake force boosting, and/or the brake fluid pump of the brake device, run when in the operational state, whereas the pumps are not in operation when in the rest state. In the rest state, a pressure built up in the hydraulic circuit or the storage pressure of the brake device cannot be built up again. When the control device is in the rest state, it may be the case that a brake pressure sufficient to safely hold the vehicle stationary on a slope cannot be built up. The wake-up electronics switch the control device from the rest state into the operational state when required, despite the ignition being deactivated, such that a follow-up delivery of hydraulic fluid or brake fluid can again be performed, and a pressure build-up can be performed.

The brake operation is determined by means of sensors that, in one embodiment, are part of the brake device. The sensors may be identical to the above-mentioned sensor for detecting the brake operation for the actuation of the valve device by means of the control device. Alternatively, other, in particular, simpler sensors, for example sensor switches with a switching characteristic for the detection of the brake operation, may be provided for the wake-up electronics, which sensors, for example, detect merely whether a brake operation is taking place.

A sensor by means of which a brake operation, in particular, including a value for the brake operation, can be detected is, for example, designed such that it can be operated directly by the brake pedal or is integrated in a booster unit, the latter being known as a servo unit and having the master brake cylinder and the brake force booster. Alternatively, in particular, in conjunction with the wake-up electronics, the sensor is an electromechanical switch that can be operated directly by the brake pedal or that is integrated in the servo unit. Alternatively or in addition, the sensor is in the form of a brake pressure switch or brake pressure sensor that measures the brake pressure modulated by means of the master brake cylinder, and/or determines whether a brake pressure has been built up by means of the master brake cylinder and/or lies above a threshold value.

The hydraulic brake system is provided for a vehicle, in particular, a utility vehicle, and has at least one hydraulically operable service brake and the brake device. The vehicle has the brake device and the hydraulic brake system and also, preferably, wheels and a drive unit such as, for example, an internal combustion engine.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is described in greater detail below using exemplary embodiments and with reference to the accompanying drawing figures, in which.

In the figures, the same reference signs are used to denote identical or at least similar or functionally identical parts.

LIST OF REFERENCE CHARACTERS

Figure 1:
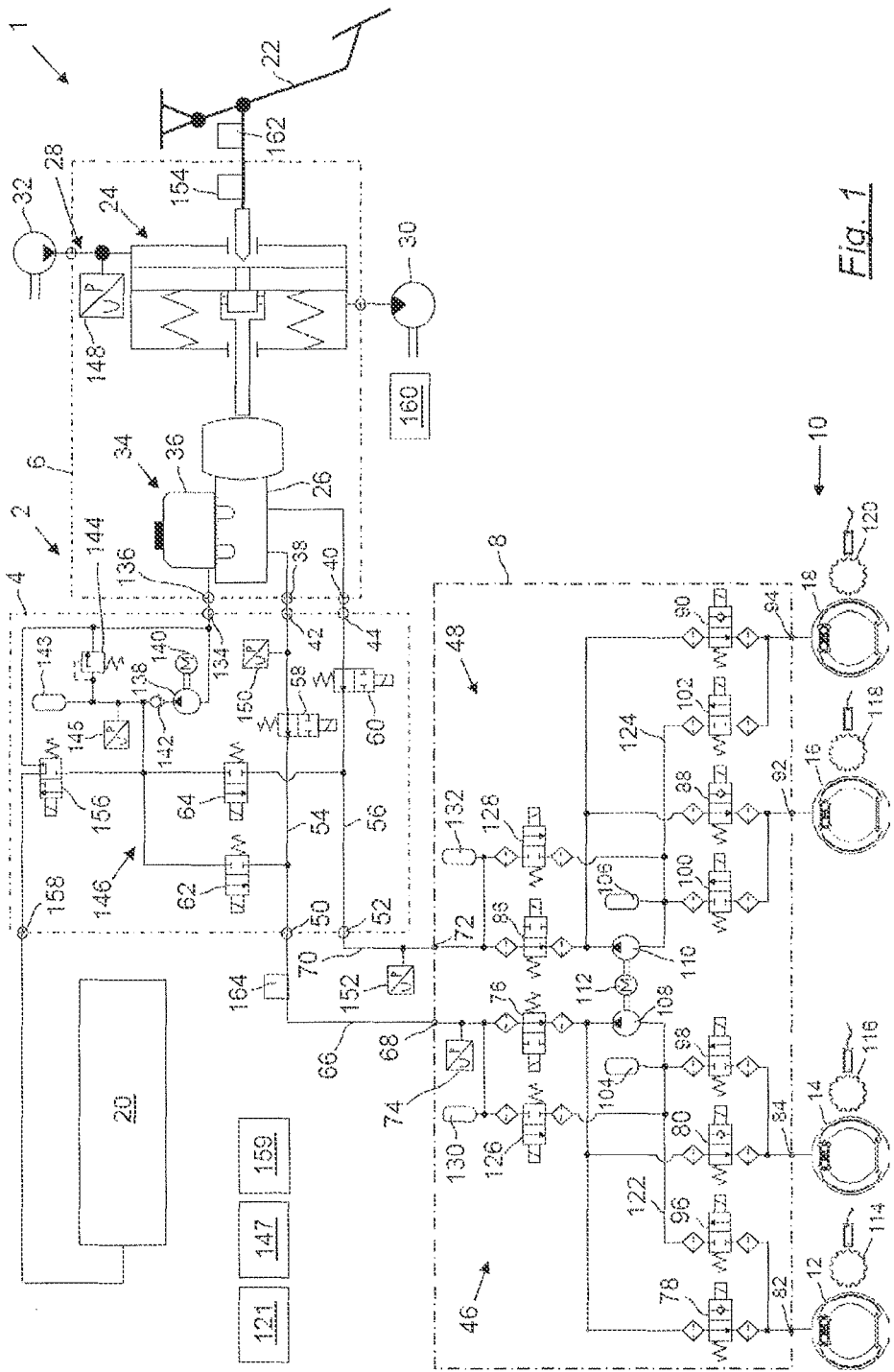
FIG. 1 shows a brake system with a brake device according to one exemplary embodiment of the present invention.

1 Brake system
2 Brake device
4 Brake module
6 Servo unit or booster unit
8 Service brake modulator
10 Service brake
12 First hydraulically actuable brake cylinder
14 Second hydraulically actuable brake cylinder
16 Third hydraulically actuable brake cylinder
18 Fourth hydraulically actuable brake cylinder
20 Parking brake
22 Brake pedal
24 Brake force booster
26 Master brake cylinder
28 Hydraulic circuit
30 Steering force booster
32 Steering assistance pump
34 Brake fluid accumulator device
36 Storage tank
38 First servo unit outlet
40 Second servo unit outlet
42 First service brake pressure inlet
44 Second service brake pressure inlet
46 First service brake circuit
48 Second service brake circuit
50 First service brake pressure outlet
52 Second service brake pressure outlet
54 First connecting duct
56 Second connecting duct
58 First shut-off valve
60 Second shut-off valve
62 First feed flow valve
64 Second feed flow valve
66 First pressure medium line
68 First service brake modulator inlet
70 Second pressure medium line
72 Second service brake modulator inlet
74 First pressure sensor
76 First switchover valve
78 First inlet valve
80 Second inlet valve
82 First service brake modulator outlet
84 Second service brake modulator outlet
86 Second switchover valve
88 Third inlet valve
90 Fourth inlet valve
92 Third service brake modulator outlet
94 Fourth service brake modulator outlet
96 First outlet valve
98 Second outlet valve
100 Third outlet valve
102 Fourth outlet valve
104 First suction accumulator
106 Second suction accumulator 108 First return pump
110 Second return pump
112 First pump motor
114 First rotational speed sensor
116 Second rotational speed sensor
118 Third rotational speed sensor
120 Fourth rotational speed sensor
121 Service brake control electronics
122 First return line
124 Second return line
126 First valve
128 Second valve
130 First pressure vessel
132 Second pressure vessel
134 Brake fluid inlet
136 Brake fluid outlet
138 Brake fluid pump
140 Second pump motor
142 Check valve
143 Third pressure vessel
144 Pressure-limiting valve
145 Second pressure sensor
146 Valve device
147 Control device
148 Third pressure sensor
150 Fourth pressure sensor
152 Fifth pressure sensor
154 Travel sensor
156 Parking brake valve
158 Parking brake release pressure outlet
159 Parking brake control electronics
160 Wake-up electronics
162 Electromechanical switch
164 Brake pressure switch
166 Braking method
168 Start of the braking method/activation of the ignition
170 Query: ignition activated?
171 End of the braking method
172 Braking method block
173 Receipt of an inlet brake pressure at the service brake pressure inlet
174 Provision of the outlet brake pressure at the service brake pressure outlet
176 Supply of brake fluid to the service brake by the master brake cylinder
178 Withdrawal of brake fluid out of the brake fluid accumulator device
180 Drawing-in of brake fluid and build-up of a storage pressure
182 Supply to the brake fluid pump and to the service brake from the common storage tank
184 Query: release parking brake?
186 Modulation of the parking brake pressure
188 Operation of the parking brake valve
190 Query by control device as to whether active brake intervention necessary
192 Query: failure of the brake force boosting action?
194 Control device actuates valve device
196 Active modulation of the outlet brake pressure
198 Shut-off of the service brake pressure outlet with respect to the service brake pressure inlet
200 Active increase of the outlet brake pressure
202 Method steps
204 Start
206 Query: ignition activated?
208 End of the method
210 Query by wake-up electronics: brake pedal operated?
212 Query: rest state?
214 Query: rest state?
216 Switch into operational state
218 Start pressure build-up in the hydraulic circuit
220 Switch into rest state
222 End pressure build-up in the hydraulic circuit

DETAILED DESCRIPTION OF THE PREFERRED EMBODIMENTS

FIG. 1 shows a brake system 1 according to one exemplary embodiment of the invention. The brake system 1 has a brake device 2 that, in turn, has a brake module 4. The brake module 4 is arranged hydraulically between a servo unit 6 or a booster unit and a service brake modulator 8. The service brake modulator 8 serves to actuate a service brake 10, which has four hydraulically operable brake cylinders, specifically, a first brake cylinder 12, a second brake cylinder 14, a third brake cylinder 16, and a fourth brake cylinder 18. Furthermore, the brake module 4 directly actuates a parking brake 20, which comprises, for example, multiple spring brake cylinders. Furthermore, the brake system 1 has a brake pedal 22.

By means of the brake pedal 22, a master brake cylinder 26 is operated via a brake force booster 24. For brake force boosting, the brake force booster 24 is incorporated into a hydraulic circuit 28 in which a hydraulic pressure is provided by means of a hydraulic fluid, in particular, a hydraulic oil, not only to the brake force booster 24, but, also, to a steering force booster 30. The pressure in the hydraulic circuit 28 is provided by means of a steering assistance pump 32. The brake force booster 24 generates hydraulic boosting of a brake actuation force, which is exerted on the brake pedal 22 and by means of which the master brake cylinder 26 is mechanically operated.

The master brake cylinder 26 is fed with brake fluid from a brake fluid accumulator device 34. The brake fluid accumulator device 34, in this exemplary embodiment, comprises a storage tank 36.

The master brake cylinder 26 is in the form of a double brake cylinder, which provides a modulated brake pressure, in each case, at a first booster outlet 38 and at a second booster outlet 40, the brake pressure thereafter prevailing as an inlet brake pressure at a first service brake pressure inlet 42 and at a second service brake pressure inlet 44 of the brake module 4. The inlet brake pressure is generated in the master brake cylinder 26 by means of a piston, which is mechanically actuated by means of the brake pedal 22, wherein, at the same time, a connection to the storage tank 36 is shut off. However, if a positive pressure prevails in the master brake cylinder 26 when the brake pedal 22 is not operated, brake fluid can escape into the storage tank 36. Conversely, when required, it is also possible, when the brake pedal 22 is not actuated, for a follow-up flow of brake fluid from the storage tank 36 into the master brake cylinder 26 to be realized. The service brake 10 is thus supplied with brake fluid directly by the master brake cylinder 26. In particular, a first service brake circuit 46 is supplied with brake fluid from the storage tank 36 by the master brake cylinder 26 through the first service brake pressure inlet 42, and a second service brake circuit 48 is supplied with brake fluid from the storage tank 36 by the master brake cylinder 26 through the second service brake pressure inlet 44. The brake device 2 also has, on the brake module 4, a first service brake pressure outlet 50, which is assigned to the first service brake circuit 46, and a second service brake pressure outlet 52, which is assigned to the second service brake circuit 48. A first connecting duct 54 connects the first service brake pressure inlet 42 to the first service brake pressure outlet 50. A second connecting duct 56 connects the second service brake pressure inlet 44 to the second service brake pressure outlet 52.

A first shut-off valve 58 is arranged in the first connecting duct 54. A second shut-off valve 60 is arranged in the second connecting duct 56. The first shut-off valve 58 and the second shut-off valve 60 are each in the form of electromagnetic 2/2 directional valves, which, under the force of a spring, assume their pass-through positions and connect the respective service brake pressure inlet 42 or 44 to the respective service brake pressure outlet 50 or 52, and, thus, ensure a pressure equalization or a transmission of pressure. By contrast, in the energized state, the first shut-off valve 58 and the second shut-off valve 60 respectively shut off the first service brake pressure outlet 50 with respect to the first service brake pressure inlet 42 and shut off the second service brake pressure outlet 52 with respect to the second service brake pressure inlet 44. The shutting-off takes place when the outlet brake pressure is to be actively increased in relation to the inlet brake pressure provided by the master brake cylinder 26. Specifically, in this case, via a first feed flow valve 62, brake fluid is forced into that part of the first connecting duct 54 that is connected to the first service brake pressure outlet 50, or into the first service brake circuit 46. Correspondingly, via a second feed flow valve 64, brake fluid is forced into that part of the second connecting duct 56 that is connected to the second service brake pressure outlet 52, or into the second service brake circuit 48. The first feed flow valve 62 and the second feed flow valve 64 are in the form of electromagnetic 2/2 directional valves, which, in the deenergized state, assume a blocking position under the force of a spring, and which, in the energized state, allow the brake fluid to be introduced into the brake circuits 46 and 48.

The first service brake pressure outlet 50 of the brake module 4 is connected via a first pressure medium line 66 to a first service brake modulator inlet 68 of the service brake modulator 8. The second service brake pressure outlet 52 is connected via a second pressure medium line 70 to a second service brake modulator inlet 72 of the service brake modulator 8.

The service brake modulator 8 is of mirror-symmetrical construction with respect to the two service brake circuits 46 and 48, aside from a pressure sensor 74 provided only in the first service brake circuit 46. The first brake cylinder 12 and the second brake cylinder 14 are operated via the first service brake circuit 46, and the third brake cylinder 16 and the fourth brake cylinder 18 are operated via the second service brake circuit 48.

The outlet brake pressure prevailing at the first service brake pressure outlet 50 and at the second service brake pressure outlet 52 can be transmitted directly to the service brake 10 or to the brake cylinders 12 to 18. For this purpose, the first service brake modulator inlet 68 is hydraulically connected to the first brake cylinder 12 and to the second brake cylinder 14 via a first switchover valve 76, via a first inlet valve 78 and second inlet valve 80, respectively, and via a first service brake modulator outlet 82 and second service brake modulator outlet 84, respectively. Corresponding connections are provided from the second service brake modulator outlet 72 to the third brake cylinder 16 and to the fourth brake cylinder 18 via a second switchover valve 86, via a third inlet valve 88 and fourth inlet valve 90, respectively, and via a third service brake modulator outlet 92 and fourth service brake modulator outlet 94, respectively. In particular, when the switchover valves 76 and 86 in the form of electromagnetic 2/2 directional valves and inlet valves 78, 80, 88 and 90 are deenergized, they assume their pass-through positions, such that the outlet brake pressure conducted through the brake module 4 or modulated at the brake module 4 and/or by means of the brake device 2 prevails at the service brake 10.

For an anti-lock function, the service brake modulator 8 has a first outlet valve 96, a second outlet valve 98, a third outlet valve 100 and a fourth outlet valve 102, in each case, in the form of electromagnetic 2/2 directional valves, and a first suction accumulator 104, a second suction accumulator 106, a first return pump 108 and a second return pump 110, wherein the return pumps 108 and 110 are driven by a common first pump motor 112. The outlet valves 96, 98, 100 and 102 each assume a blocking position under the force of a spring when in the deenergized state. By contrast, in the energized state, the outlet valves 96, 98, 100 and 102 assume pass-through positions, and the inlet valves 78, 80, 88 and 90, when in the energized state, assume the function of a check valve, which permits a return flow of brake fluid from the service brake 10, but blocks a flow in the opposite direction.

A locking tendency at wheels assigned to the brake cylinders 12, 14, 16 and 18 is detected, for example, by means of a first rotational speed sensor 114, a second rotational speed sensor 116, a third rotational speed sensor 118 and a fourth rotational speed sensor 120, by service brake control electronics 121 or by further control electronics. The service brake control electronics 121 are connected via electrical lines to the rotational speed sensors 114 to 120 and to the service brake modulator 8 for the actuation thereof.

The mode of operation of the ABS function will be described on the basis of a blocking tendency, detected, by way of example, by means of the first rotational speed sensor 114, of the wheel assigned to the first brake cylinder 12. In order to release the service brake 10 at the wheel, or in order to lower the brake pressure at the first brake cylinder 12 in relation to the outlet brake pressure provided by means of the brake device 2, the control device 121 energizes the first inlet valve 78 and the first outlet valve 96. As a result, brake fluid is returned through the first outlet valve 96 by means of the first return pump 108, and the pressure at the first service brake modulator outlet 82 is thereby lowered.

In particular, the first return pump 108 ensures that, already, before the opening of the first outlet valve 96, a pressure lower than the outlet brake pressure prevails in a first return line 122, which is connected to the first suction accumulator 104 and to the inlet of the first return pump 108, such that a fast return flow of brake fluid through the first return line 122 can be realized. The first suction accumulator 104 constitutes a reservoir for returning brake fluid, and, thus, ensures an adequately large capacity for returning brake fluid within a shorter time than that required for the first return pump 108 to impart a delivery action. The same mode of operation is realized for the second brake cylinder 14 and, in conjunction with the second suction accumulator 106 and a second return line 124, for the third brake cylinder 16 and the fourth brake cylinder 18.

The service brake modulator 8 has not only the ABS function but also an emergency boosting function in which the return pumps 108 and 110 assist a fast pressure build-up or provide for an active pressure build-up. In this case, the brake fluid is conducted from the first service brake modulator inlet 68 and from the second service brake modulator inlet 72, not through the first switchover valve 76 and the second switchover valve 86, respectively, to the inlet valves 78 and 80 and inlet valves 88 and 90, respectively, the brake fluid instead flowing via a first valve 126 and second valve 128, respectively, these being formed, in each case, as electromagnetic 2/2 directional valves, via the first return line 122 and second return line 124, respectively, to the inlet of the first return pump 108 and of the second return pump 110, respectively, and thereby being conducted to the inlet valves 78 and 80 and inlet valves 88 and 90, respectively, with a pressure boosting action.

For this purpose, the valves 126 and 128, which in the deenergized state assume blocking positions under the force of a spring, are energized such that they assume pass-through positions. For this purpose, the switchover valves 76 and 86 must likewise be energized and assume blocking position so that it is actually also possible for pressures different than those at the inlets of the switchover valves 76 and 86 to prevail at the outlets of the switchover valves 76 and 86. Finally, the service brake modulator 8 has a first pressure vessel 130, which is hydraulically connected to the first service brake modulator inlet 68, and a second pressure vessel 132, which is hydraulically connected to the second service brake modulator inlet 72.

The brake module 4 connected upstream of the service brake modulator 8 enhances the ABS functionality provided by the service brake modulator 8 to include further functions. For this purpose, the brake device 2 or the brake module 4 has a brake fluid inlet 134 connected via a brake fluid outlet 136 of the servo unit 6 to the brake fluid accumulator device 34 or to the storage tank 36, such that a brake fluid pump 138 of the brake device 2 can draw brake fluid out of the storage tank 36 through the brake fluid outlet 136 and the brake fluid inlet 134. The brake fluid pump 138 is driven by means of a second pump motor 140. Connected downstream of the brake fluid pump 138 is a check valve 142, which prevents any return flow of brake fluid through the brake fluid pump 138 into the storage tank 36 if the brake fluid pump 138 fails.

A storage pressure built up by means of the brake fluid pump 138 is stored by means of a third pressure vessel 143. Any positive pressure can be discharged to the storage tank 36 by means of a pressure-limiting valve 144. The built-up storage pressure is detected by means of a second pressure sensor 145 and is used by means of the first feed flow valve 62 and by means of the second feed flow valve 64 to increase the outlet brake pressure in the first service brake circuit 46 and in the second service brake circuit 48, respectively. In this way, the outlet brake pressure can be actively modulated or increased by means of a valve device 146 that has the feed flow valves 62 and 64. The valve device 146 may additionally have the shut-off valves 58 and 60. The valve device 146 is actuated by a control device 147 via electrical lines. It is, for example, possible for the outlet brake pressure to be actively increased if the control device 147 or some other control device or the service brake control electronics 121 detect(s) a critical driving state and, in response, actively increase(s) the outlet brake pressure. By contrast to the embodiment shown, the control device 147 may also comprise, or be combined with, the service brake control electronics 121. The control device 121 thus also controls the service brake modulator 8, in particular, the inlet valves 78, 80, 88 and 90, in a manner suitable for excluding individual brakes or one or more of the brake cylinders 12, 14, 16 and 18 from a brake pressure increase, or for limiting the pressure at the service brake modulator outlets 82, 84, 92 and/or 94 in relation to the modulated outlet brake pressure for this purpose. In particular, the brake device 2 or the brake module 4 enhances the ABS functionality of the service brake modulator 8 to include traction control, to include functions of an electronic stability system and of a system for preventing lateral tilting, and to include an emergency braking assistant.

Furthermore, the brake device 2 or the brake module 4 permits an active brake pressure build-up in accordance with an operation of the brake pedal 22 if the brake pressure assistance by the hydraulic circuit 28 fails, for example, in the event of failure of the steering assistance pump 32. For this purpose, a third pressure sensor 148 is provided in the hydraulic circuit 28 to detect an insufficient pressure or a failure of the steering assistance pump 32. If a pressure detected by means of the third pressure sensor 148 is identified as being insufficient or indicates a failure of the steering assistance pump 32, the shut-off valves 58 and 60 are energized and, thus, placed into their blocking positions. Consequently, the inlet brake pressure can be easily modulated even without brake force boosting. Here, the inlet brake pressure is modulated by means of a deceleration regulator. In response to an operation of the brake pedal 22, a deceleration demand is inferred and the inlet brake pressure is modulated by means of the valves 58, 60, 62 and 64 such that the actual vehicle deceleration is set in accordance with the deceleration demand. The vehicle deceleration is, for this purpose, determined by means of the rotational speed sensors 114-120.

The modulated inlet brake pressure is detected by means of a fourth pressure sensor 150 of the brake device 2 and may, if appropriate, be taken into consideration for the active modulation of the outlet brake pressure by means of the feed flow valves 62 and 64. The actual outlet brake pressure in the first brake circuit is detected by means of the first pressure sensor 74. For the determination of the actual outlet brake pressure in the second brake circuit 48, an additional fifth pressure sensor 152 is provided in the second pressure medium line 70.

For the pressure build-up, the feed flow valves 62 and 64 are actuated such that the outlet pressure detected by means of the first pressure sensor 74 and by means of the fifth pressure sensor 152 increases in accordance with the deceleration regulation or, alternatively, to the pressure detected by means of the fourth pressure sensor 150. For pressure dissipation in the event that the deceleration demand is lower than the present vehicle deceleration, or alternatively, in the event that the pressure detected at the fourth pressure sensor 150 falls below the pressure detected at the first pressure sensor 74 or below the pressure detected at the fifth pressure sensor 152, the first shut-off valve 58 or the second shut-off valve 60, respectively, is switched into the respective pass-through position until the desired low vehicle deceleration is attained or until pressure equality is attained.

The servo unit 6 has a travel sensor 154, which detects an operation travel of the brake pedal 22. The brake device 2 takes data from the travel sensor 154 into consideration in order, as a function of the data, to actively modulate the outlet brake pressure in the event of failure of the brake force booster 24. By contrast to the exemplary embodiment shown, the active modulation of the outlet brake pressure in response to an operation of the brake pedal 22 is performed only alternatively as a function of sensor data from the fourth pressure sensor 150 or as a function of sensor data from the travel sensor 154. Thus, in contrast to the exemplary embodiment shown, the fourth pressure sensor 150 or the travel sensor 154 may also be omitted.

Furthermore, in the brake module 4, the valve device 146 has a parking brake valve 156 in the form of an electromagnetic 3/2 directional valve, which, in the deenergized state, connects the parking brake 20 via a parking brake release pressure outlet 158 to the storage tank 36 in order for brake fluid to be discharged, and, in the energized state, connects the parking brake 20 to the third pressure vessel 143, and, thus, to the storage pressure, for the supply of brake fluid and the build-up of pressure. The storage pressure stored by means of the third pressure vessel 143 can be conducted as a parking brake release pressure to the parking brake 20 in order to realize a fast release of the parking brake 20. Conversely, a fast pressure dissipation and, thus, fast engagement of the parking brake 20 are also possible.

At least the brake fluid pump 138 and the parking brake valve 156 are actuated by parking brake control electronics 159, which are not identical to the service brake control electronics 121 that actuate the service brake modulator 8. It is thus possible for the parking brake 20 to be released or engaged, and, thus, operated, independently of the service brake 10, or independently of the functionality of the service brake modulator 8 and of the functionality of the control device 121 that actuates the service brake modulator 8. In the event of failure of the service brake, the parking brake functionality thus remains available, for example, for an emergency braking function. The availability of braking force in the vehicle is thus increased significantly.

In an alternative embodiment to the exemplary embodiment of FIG. 1, the parking brake valve 156 and the parking brake release pressure outlet 158 of the brake module 4 are omitted, such that only the service brake pressure in the service brake circuits 46 and 48, but not the parking brake release pressure, can be actively modulated by means of the parking brake module 4. The parking brake 20, if provided, is, in this case, actuated in some other way, for example, by a separate parking brake module.

In another alternative exemplary embodiment, the brake module 4 duly has the parking brake valve 156 and the parking brake release pressure outlet 158, but does not have the valves 58, 60, 62 and 64, such that only the parking brake release pressure is actuated, and the service brake pressure is not influenced, by means of the parking brake module 4.

The brake system 1 or the brake device 2 as per FIG. 1 has wake-up electronics 160, which ensure an adequate brake pressure build-up even when the ignition is deactivated. In particular, the wake-up electronics detect an operation of the brake pedal 22 when the ignition is deactivated, and, thereby, wake up control electronics that actuate the brake device 2 or the brake module 4 and/or the steering assistance pump 32, the control electronics being, in particular, the control device 147 and/or the service brake control electronics 121 and/or the parking brake control electronics 159 and/or some other control electronics. The wake-up electronics 160 thus ensure that a pressure for the brake force boosting is built up in the hydraulic circuit 28 and/or, in the brake module 4, the storage pressure is built up by means of the brake fluid pump 138. The pressure storage capacity, in particular, in the third pressure vessel 143, is significantly lower in the case of hydraulically operated brake systems than in the case of compressed-air brake systems, such that follow-up delivery of brake fluid must be performed constantly.

The wake-up electronics 160 are woken up in response to an operation of the brake when the ignition is deactivated, such that a processor of the wake-up electronics 160 thereafter draw power. An electromechanical switch 162, which may alternatively also be integrated into the servo unit 6, mechanically switches an electrical contact in the event of operation of the brake pedal 22, wherein the wake-up electronics 160 trigger the wake-up in response to the switching of the electromechanical switch 162.

Alternatively or in addition, a brake pressure switch 164 switches the wake-up electronics 160, so as to wake up the respective control device or control electronics, in response to a brake pressure being detected. The brake pressure switch 164 is arranged in the first pressure medium line 66 and switches when a minimum pressure is overshot in the first pressure medium line 66, or when the outlet brake pressure reaches the minimum pressure.

Even though the exemplary embodiment shows both the electromechanical switch 162 and also the brake pressure switch 164 and the travel sensor 154 and the pressure sensors 150, 74 and 152, the wake-up electronics are preferably switched only by means of one of the switches or sensors, such that, as an alternative to the exemplary embodiment shown, the other switches or sensors may also be omitted if they are not required for other purposes.

However, if data are available from multiple sensors and/or switches, it is possible, in an alternative exemplary embodiment, for the signals or data thereby provided to be compared with one another, and malfunctions thereby identified. In particular, as an alternative to the exemplary embodiment shown, the wake-up electronics may permanently draw electrical power and process sensor data from the travel sensor 154 or from the fourth pressure sensor 150 or from the first pressure sensor 74 or from the fifth pressure sensor 152. In response to a brake operation being detected, the wake-up electronics 160 wake up the control device 121, 147 and/or 159.

The respective sensors and/or switches are connected to the wake-up electronics 160 via electrical lines. The wake-up electronics 160 have an electrical connection to the control device 147 and/or to the service brake control electronics 121 and/or to the parking brake control electronics 159.

Figure 2:
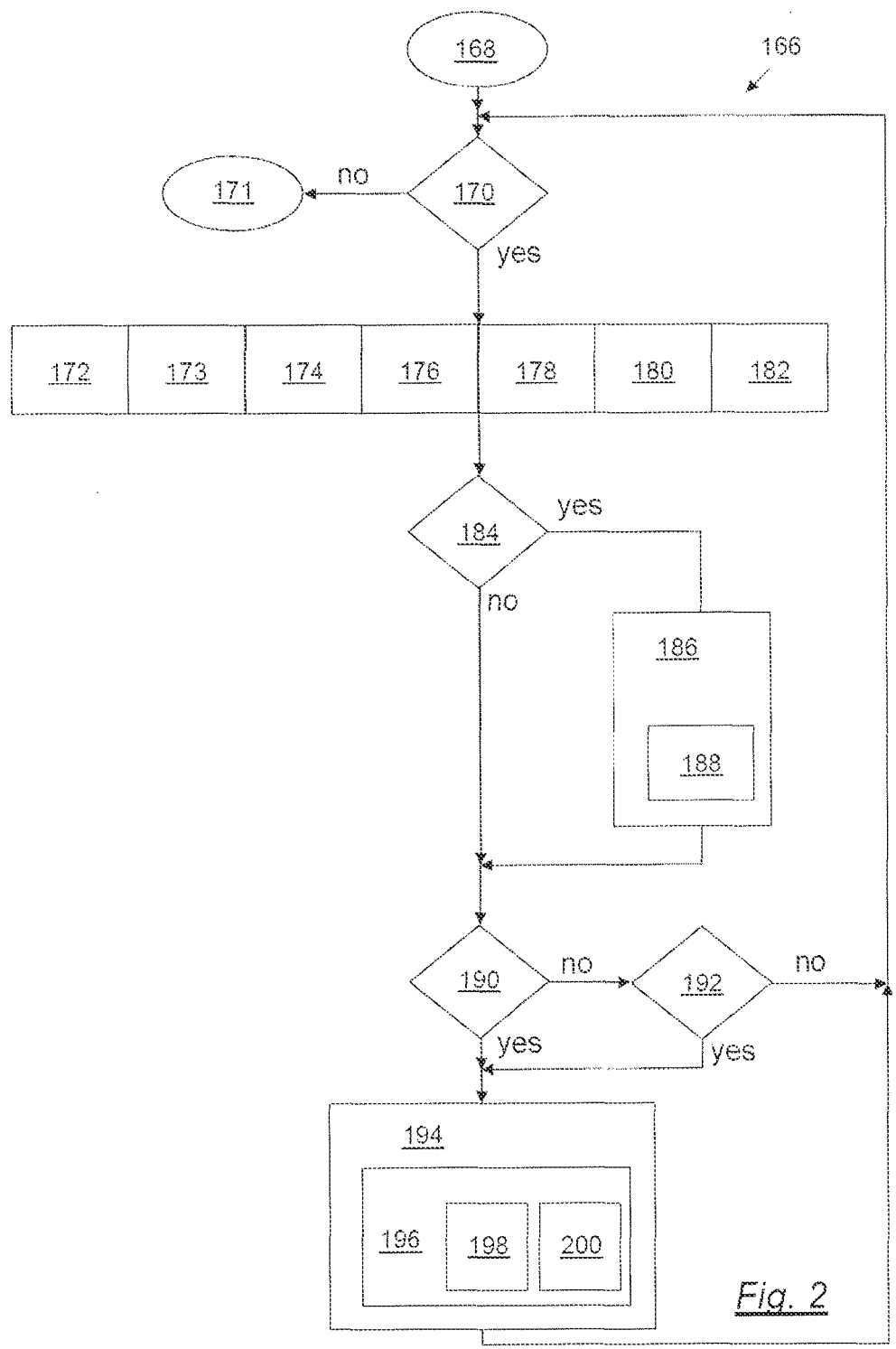
FIG. 2 is a block diagram illustrating a braking method according to one exemplary embodiment of the invention.

FIG. 2 is a block circuit diagram for simplified illustration of steps of a braking method 166 as per an exemplary embodiment of the invention. In particular, the illustration shows, in simplified form, method steps when the ignition of the vehicle, which has, in particular, the brake system 1 of the first exemplary embodiment as per FIG. 1, is activated. The block circuit diagram as per FIG. 2, in this case, shows merely, by way of example, one of numerous possible embodiments of the invention that will be readily apparent to a person skilled in the art with knowledge of the invention.

The braking method 166 starts, in step 168, for example, with the activation of the ignition. If it is established in query 170 that the ignition is no longer activated, or if the brake system 1 is no longer in its operational state, the method ends at step 171, as illustrated. Otherwise, braking method block 172 follows with steps 173, 174, 176, 178, 180 and 182. In step 173, an inlet brake pressure built up by means of the master brake cylinder 26 is received at the service brake pressure inlet 42 and 44. If the brake pedal 22 is operated, the inlet brake pressure has a non-zero magnitude.

In step 174, an outlet brake pressure is provided to the service brake modulator 8 at the service brake pressure outlet 50 and 52. In step 176, the service brake 10 is supplied with brake fluid from the brake fluid accumulator device 34 or from the storage tank 36 by the master brake cylinder 26 through the connecting duct 54 and 56 and, furthermore, through the service brake modulator 8. In particular, by means of the master brake cylinder 26, the pressure can be built up directly in the service brake circuits 46 and 48. The service brake circuits 46 and 48 are led in pressure-mediumconnecting fashion directly into the master brake cylinder 26 and are not operated indirectly via a relay valve. It is thus also the case that, in addition to the storage tank 36, no further storage tank for the feed of brake fluid to the brake circuits 46 and 48 is provided.

In step 178, it is furthermore the case that brake fluid is received from the brake fluid accumulator device 34 or from the storage tank 36 through the brake fluid inlet 134. In step 180, the brake fluid pump 138 draws brake fluid in through the brake fluid inlet 134 and, thereby, builds up a storage pressure. In step 182, the service brake 10 is supplied with the brake fluid by the master brake cylinder 26, and the brake fluid pump 138 is supplied with the brake fluid through the brake fluid inlet 134, the brake fluid being supplied from the same storage tank 36.

If it is established in query 184 that the parking brake 20 is to be released or the parking brake release pressure is to be changed, the valve device 146 actively modulates the parking brake release pressure for the parking brake 20 by means of the built-up storage pressure. In particular, step 186 includes step 188 in which the parking brake valve 156 is operated correspondingly.

Query 190 follows in which the control device 147, after evaluation of sensor information, determines whether an active braking intervention is required. If it is determined that an active braking intervention is to be performed, or if a failure of the brake force boosting is identified in query 192, then, in step 194, the control device 147 actuates the valve device 146 so as to actively modulate the outlet brake pressure. Otherwise, the method is continued at query 170.

After corresponding actuation of the valve device 146 in step 194, the valve device 146 actively modulates the outlet brake pressure by means of the built-up storage pressure in step 196. Here, in step 198, the shut-off valve 58 and/or 60 arranged in the connecting duct 54 and/or 56, respectively, shut(s) off the service brake pressure inlet 42 and/or 44, respectively, with respect to the service brake pressure outlet 50 and/or 52, respectively, in order that no feedback is perceptible to the driver in the brake pedal. As long as the connecting duct 54 and/or 56 is shut off in this way, the service brake 10 is shut off from the supply of brake fluid by the master brake cylinder 26 as per step 176. Finally, step 196 includes step 200 in which the feed flow valve 62 and/or 64 actively increase(s) the outlet brake pressure by introducing brake fluid, which has been drawn in by means of the brake fluid pump 138, into the connecting duct 54 and/or 56, respectively, between the shut-off valve 58 and/or 60, respectively, and the service brake pressure outlet 50 and/or 52, respectively. This is followed by query 170.

Figure 3:
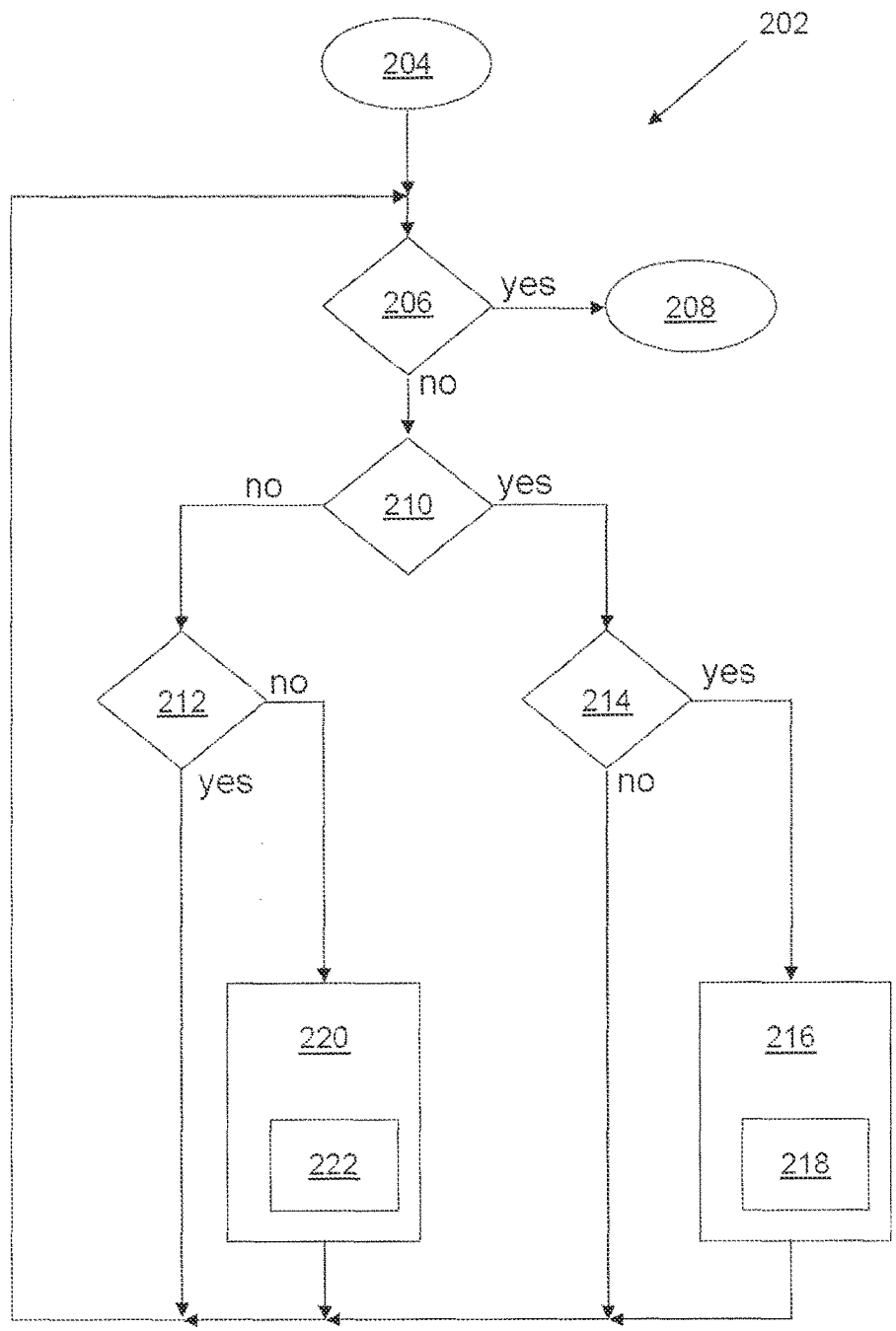
FIG. 3 is a block diagram illustrates method steps for enhancing the braking method of the exemplary embodiment illustrated in FIG. 2.

FIG. 3 is a block diagram illustrating method steps 202 by which the braking method of the exemplary embodiment of FIG. 2 can, in accordance with an exemplary embodiment of the invention, be enhanced. The start 204 of the method is, thus, initially followed by query 206 as to whether the ignition is activated. If this is the case, the method, or the illustrated method steps 202, is/are ended in step 208. This may be followed by the method steps as per FIG. 2. Otherwise, query 210, as to whether the brake pedal 22 is operated, follows. In particular, a brake operation is detected, for example, by means of the electromechanical switch 162 or by means of the brake pressure switch 164 or by means of one of the pressure sensors 74, 150 and 152, wherein the brake operation causes an electrical contact to be closed, this causing the wake-up electronics 160, in particular, a processor of the wake-up electronics 160, to be energized or triggered so as to draw electrical power, and thus woken up. Here, query 210 is to be understood as a junction defined by the state of the switch 162 and/or 164 and/or sensor 74, 150, 152, wherein the method is continued either in the "yes" branch or in the "no" branch depending on the respective state (closed or open, or above or below a defined switching pressure).

In an alternative embodiment in which the wake-up electronics 160 are permanently energized or permanently draw electrical power, sensor data may be provided to the wake-up electronics 160, wherein the wake-up electronics 160 actively determine whether the brake pedal 22 is operated.

For as long as no brake operation is detected and the control device 147 and/or the service brake control electronics 121 and/or the parking brake control electronics 159 is/are in a rest state, this being established by means of query 212, the wake-up electronics 160 also do not draw electrical power, or are deenergized or in a sleep state, and the method is continued with query 206.

If, in query 210, a brake operation is detected, the wake-up electronics 160 draw electrical power, or are energized, and are thus woken up. In particular, the wake-up electronics 160 are switched on by means of the switch 162 and/or 164 or sensor 74, 150, 152, 154.

If it is established by means of query 214 that the control device 147 and/or the control electronics 121 and/or 159 is/are still in the rest state, then, in step 216, the control device 147 and/or the control electronics 121 and/or 159 is/are switched from the rest state into the operational state, or woken up, by means of the wake-up electronics 160. Step 216 optionally includes step 218, in which the pressure build-up is commenced at least in the hydraulic circuit 28, such that at least the brake force booster 24 is functional, in particular, if the pressure build-up in the hydraulic circuit 28 is realized by means of an electrically driven pump.

After the wake-up, or when the operational state is attained, query 214 is followed by query 206. If it is now established by means of query 210 that no brake operation is detected, but the control device 147 and/or 121 and/or 159 is/are still in the operational state according to query 212 (when the ignition is deactivated), that is, if the switch 162 and/or 164 is open (when the ignition is deactivated) or the pressure at the sensor 74, 150, 152, 154 falls below a switching pressure, then in step 220, after a follow-on time, the control device 147 and/or the control electronics 121 and/or 159 is/are switched from the operational state into the rest state again, or placed into a sleep state again, in particular, by means of the wake-up electronics 160. It is preferable for the wake-up electronics 160 to also be placed into a sleep state again. Step 220 includes step 222, in which the pressure build-up in the hydraulic circuit 28 is thus ended.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A braking method for a vehicle, comprising:
  a) receiving, at a service brake pressure inlet, an inlet brake pressure built up by a master brake cylinder;

b) providing, at a service brake pressure outlet, an outlet brake pressure to a service brake modulator that provides an anti-lock brake function, the service brake modulator being connected upstream of a service brake;

c) supplying, by a connection duct connecting the service brake pressure inlet to the service brake pressure outlet, the service brake with brake fluid via the service brake modulator, wherein the brake fluid is provided by the master brake cylinder from a brake fluid accumulator device configured to feed the master brake cylinder;

d) using a brake fluid pump, drawing brake fluid in from the brake fluid accumulator device through a brake fluid inlet and pressurizing the drawn-in brake fluid to a storage pressure; and e) using a valve device having feed flow valves, shut-off valves, and a parking brake valve, actively modulating, via the feed flow valves, the outlet brake pressure using the built-up storage pressure and actively modulating, using the parking brake valve, a parking brake release pressure for a parking brake using the built-up storage pressure, wherein the valve device comprises a connecting duct configured to connect the built-up storage pressure to each of the feed flow valves and the parking brake valve, and wherein one of the feed flow valves is configured to operate an inlet valves in a service brake circuit of the service brake modulator, and another of the feed flow valves is configured to operate another inlet valve in a different service brake circuit of the service brake modulator.

2. The braking method as claimed in claim 1, wherein at least one of the shut-off valves is disposed in the connection duct, and wherein actively modulating the outlet brake pressure comprises:

a) using the at least one shut-off valve, shutting off the service brake pressure inlet with respect to the service brake pressure outlet; and b) using at least one of the feed flow valves, actively increasing the outlet brake pressure by introducing pressurized drawn-in brake fluid into the connecting duct between the at least one shut-off valve and the service brake pressure outlet.

3. The braking method as claimed in claim 1, further comprising using a control device to actuate the valve device as a function of a detected brake operation such that the outlet brake pressure is modulated as a function of at least one of a determined driving state of the vehicle and when a failure of a brake force boosting action is detected.

4. The braking method as claimed in claim 1, wherein brake fluid is supplied to the service brake and to the brake fluid pump from a common storage tank of the brake fluid accumulator device.

5. The braking method as claimed in claim 3, further comprising using wake-up electronics to switch at least one of (i) one of the control device and parts thereof and (ii) one of service brake control electronics and parts thereof and (iii) one of parking brake control electronics and parts thereof from a rest state into an operational state in response to detection of a brake operation.

6. A brake device for a vehicle, comprising:

a) at least one service brake pressure inlet configured to receive, from a master brake cylinder, an inlet brake pressure built up by the master brake cylinder;

b) at least one service brake pressure outlet configured to provide an outlet brake pressure for a service brake modulator connected upstream of a service brake and which provides an anti-lock brake function;

c) at least one connection duct configured to connect the at least one service brake pressure inlet to the at least one service brake pressure outlet and to supply brake fluid through the service brake modulator to the service brake wherein the brake fluid is provided by the master brake cylinder from a brake fluid accumulator device configured to feed the master brake cylinder;

d) a brake fluid pump configured to draw-in brake fluid from the brake fluid accumulator device through a brake fluid inlet, the brake fluid pump being further configured to pressurize the drawn-in fluid to a storage pressure; and e) a valve device having feed flow valves and shut-off valves configured to actively modulate the outlet brake pressure by the built-up storage pressure and having a parking brake valve configured to actively modulate a parking brake release pressure for a parking brake using the built-up storage pressure, the valve device further having a connecting duct configured to connect the built-up storage pressure to each of the feed flow valves and the parking brake valve, wherein one of the feed flow valves is configured to provide the built-up storage pressure to an inlet valve in a service brake circuit of the service brake modulator, and another of the feed flow valves is configured to provide the built-up storage pressure to another inlet valve in a different service brake circuit of the service brake modulator.

7. The brake device as claimed in claim 6, wherein the shut-off valves are disposed in the at least one connection duct and configured to shut off the at least one service brake pressure inlet with respect to the at least one service brake pressure outlet, and wherein at least one of the feed flow valves is configured to actively increase the outlet brake pressure by introducing brake fluid drawn in by the brake fluid pump into the at least one connection duct between the shut-off valves and the at least one service brake pressure outlet.

8. The brake device as claimed in claim 6, further comprising a control device for actuating the valve device as a function of a detected brake operation.

9. The brake device as claimed in claim 6, further comprising parking brake control electronics for controlling the parking brake, the parking brake control electronics being separate from service brake control electronics for controlling the service brake.

10. The brake device as claimed in claim 6, wherein the brake fluid accumulator device has a common storage tank for supplying brake fluid to the service brake by the master brake cylinder, and for supplying brake fluid to the brake fluid pump through the brake fluid inlet.

11. The brake device as claimed in claim 8, further comprising wake-up electronics for switching at least one of (i) one of the control device and parts thereof and (ii) one of service brake control electronics and parts thereof and (ii) one of parking brake control electronics and parts thereof from a rest state into an operational state in response to detection of a brake operation.

12. A brake device configured to effect the braking method as claimed in claim 1.

13. A hydraulic brake system for a vehicle, comprising a hydraulically operable service brake; and a brake device, the brake device comprising:

a) at least one service brake pressure inlet configured to receive, from a master brake cylinder, an inlet brake pressure built up by the master brake cylinder;

b) at least one service brake pressure outlet configured to provide an outlet brake pressure for a service brake modulator connected upstream of a service brake and which provides an anti-lock brake function;

c) at least one connection duct configured to connect the at least one service brake pressure inlet to the at least one service brake pressure outlet and to supply brake fluid through the service brake modulator to the service brake, wherein the brake fluid is provided by the master brake cylinder from a brake fluid accumulator device configured to feed the master brake cylinder;

d) a brake fluid pump configured to draw-in brake fluid from the brake fluid accumulator device through a brake fluid inlet, the brake fluid pump being further configured to pressurize the drawn-in fluid to a storage pressure; and e) a valve device having feed flow valves and shut-off valves configured to actively modulate the outlet brake pressure by the built-up storage pressure and having a parking brake valve configured to actively modulate a parking brake release pressure for a parking brake using the built-up storage pressure, the valve device further having a connecting duct configured to connect the built-up storage pressure to each of the feed flow valves and the parking brake valve, wherein one of the feed flow valves is configured to provide the built-up storage pressure to an inlet valve in a service brake circuit of the service brake modulator, and another of the feed flow valves is configured to provide the built-up storage pressure to another inlet valve in a different service brake circuit of the service brake modulator.

14. A vehicle, comprising a brake device, the brake device comprising:

a) at least one service brake pressure inlet configured to receive, from a master brake cylinder, an inlet brake pressure built up by the master brake cylinder;

b) at least one service brake pressure outlet configured to provide an outlet brake pressure for a service brake modulator connected upstream of a service brake and which provides an anti-lock brake function;

c) at least one connection duct configured to connect the at least one service brake pressure inlet to the at least one service brake pressure outlet and to supply brake fluid through the service brake modulator to the service brake, wherein the brake fluid is provided by the master brake cylinder from a brake fluid accumulator device configured to feed the master brake cylinder;

d) a brake fluid pump configured to draw-in brake fluid from the brake fluid accumulator device through a brake fluid inlet, the brake fluid pump being further configured to pressurize the drawn-in fluid to a storage pressure; and e) a valve device having feed flow valves and shut-off valves configured to actively modulate the outlet brake pressure by the built-up storage pressure and having a parking brake valve configured to actively modulate a parking brake release pressure for a parking brake using the built-up storage pressure, the valve device further having a connecting duct configured to connect the built-up storage pressure to each of the feed flow valves and the parking brake valve, wherein one of the feed flow valves is configured to proivde the built-up storage pressure to an inlet valve in a service brake circuit of the service brake modulator, and another of the feed flow valves is configured to provide the built-up storage pressure to another inlet valve in a different service brake circuit of the service brake modulator.

15. A vehicle, comprising a hydraulic brake system having a hydraulically operable service brake and a brake device, the brake device comprising:

a) at least one service brake pressure inlet configured to receive, from a master brake cylinder, an inlet brake pressure built up by the master brake cylinder;

b) at least one service brake pressure outlet configured to provide an outlet brake pressure for a service brake modulator connected upstream of a service brake and which provides an anti-lock brake function;

c) at least one connection duct configured to connect the at least one service brake pressure inlet to the at least one service brake pressure outlet and to supply brake fluid through the service brake modulator to the service brake, wherein the brake fluid is provided by the master brake cylinder from a brake fluid accumulator device configured to feed the master brake cylinder;

d) a brake fluid pump configured to draw-in brake fluid from the brake fluid accumulator device through a brake fluid inlet, the brake fluid pump being further configured to pressurize the drawn-in fluid to a storage pressure; and e) a valve device having feed flow valves and shut-off valves configured to actively modulate the outlet brake pressure by the built-up storage pressure and having a parking brake valve configured to actively modulate a parking brake release pressure for a parking brake using the built-up storage pressure, the valve device further having a connecting duct configured to connect the built-up storage pressure to each of the feed flow valves and the parking brake valve, wherein one of the feed flow valves is configured to provide the built-up storage pressure to an inlet valve in a service brake circuit of the service brake modulator, and another of the feed flow valves is configured to provide the built-up storage pressure to another inlet valve in a different service brake circuit of the service brake modulator.

* * * * *